United States Patent [19]
Konrad

[11] 3,891,902
[45] June 24, 1975

[54] SPEED CONTROL UNIT FOR ELECTRIC VEHICLES

[75] Inventor: Charles Edward Konrad, Roanoke, Va.

[73] Assignee: General Electric Company, Salem, Va.

[22] Filed: Dec. 3, 1973

[21] Appl. No.: 420,889

[52] U.S. Cl. ............................ 318/139; 318/341
[51] Int. Cl.² ........................................ H02P 5/16
[58] Field of Search ........ 318/446, 305, 306, 310, 318/301, 139, 345, 254; 310/DIG. 3, 341

[56] References Cited
UNITED STATES PATENTS

| | | | |
|---|---|---|---|
| 3,112,464 | 11/1963 | Ratajski et al. | 310/10.11 |
| 3,194,990 | 3/1965 | Kendall | 310/41 |
| 3,562,616 | 2/1971 | Elliott | 318/332 |
| 3,746,966 | 7/1973 | Torok et al. | 318/332 |
| 3,755,724 | 8/1973 | Anderson | 318/139 |
| 3,812,409 | 5/1974 | Dinger | 318/310 |
| 3,818,292 | 6/1974 | Berman | 318/341 |

*Primary Examiner*—Robert K. Schaefer
*Assistant Examiner*—John J. Feldhaus
*Attorney, Agent, or Firm*—James H. Beusse; Walter C. Bernkopf

[57] ABSTRACT

An improved speed control unit for governing the operation of electric vehicles utilizing pulse-type control systems. A Hall generator is coupled to a manually operated lever, and rotated within a defined range to produce a voltage proportional to the angular displacement of the lever. Circuitry is provided for shaping the generator output in a desired manner and for controlling the mark-space ratio of a thyristor in response thereto.

5 Claims, 5 Drawing Figures

PATENTED JUN 24 1975  3,891,902

SHEET 1

SPEED CONTROL UNIT FOR ELECTRIC VEHICLES

BACKGROUND OF THE INVENTION

The present invention relates to electric vehicle controls and, more particularly, to improved means for controlling the mark-space ratio of a d.c. pulse control system as a function of rotation of a manually operated element.

While many types of controls have been devised for electric vehicles, until the advent of the modern pulse control or "chopper" systems the most prevalent method was to provide a series of electromechanical switches which were serially activated by movement of a manually operated lever. As each switch was closed, a corresponding segment of a resistor lying in series between a traction motor and a source of electric potential was shunted by means of a contactor. As the effective resistance grew progressively smaller, an increasingly larger voltage was applied to the motor to provide increased power to the vehicle. Such switched resistor systems were inefficient due to large $I^2R$ losses, and required a large number of electromechanical switch devices.

With the advent of power transistors, and more particularly gated thyristors such as the silicon controlled rectifier (SCR) it became possible to provide infinitely variable potential to a motor by coupling the motor to a source of potential through the SCR and switching it on and off rapidly. The ratio of conductive to nonconductive periods, ordinarily termed the mark-space ratio, determines the percentage of available electric potential which is impressed across the motor. This variation is commonly achieved in one of two ways: either a fixed conductive interval is provided by the circuitry, and the frequency of occurrence of these intervals varied by means of an oscillator; or the frequency of gating the thyristor is maintained constant and the duration of conductivity varied. In either case, the net effect is to vary the mark-space ratio of the system, and thus the effective potential available across the traction motor.

The thyristor gating systems are commonly constructed so as to operate as a function of an input or control voltage. In order to provide a voltage which is easily varied by a vehicle operator, a variable resistor such as a potentiometer is commonly used. The most easily available and economical potentiometers have traditionally been those of the wire-wound variety, which depend upon the relative motion of a slider upon a series of windings in order to produce a variable voltage. Such devices, however, are susceptible to rapid wear due to friction between the slider and the conductors; moreover, often impurities form a film which electrically separates the slider from the conductors. Improvements in the design of potentiometers have resulted in more durable devices but, due to the inherent frictional contact within the potentiometer, wear and friction has continued to be a problem. Due to the peculiarities of usage in vehicles, usually the most extreme wear occurs near the lower end of the potentiometer since the control is most often operated in that position. Moreover since a vehicle operator cannot remain absolutely steady the potentiometer slider is constantly in motion, its instantaneous position being determined by a manually-held lever or a spring-loaded foot pedal.

In view of the foregoing deficiencies of potentiometer-type controls in electric vehicles many efforts have been made to produce non-contacting types of controls. One commercially produced type of control utilizes a differential transformer having a movable core member which is rotated in response by a lever. However, in order to operate an electromagnetic device it is necessary to provide an inverter to change the d.c. voltage of the vehicle batteries to alternating current. In addition, it is necessary to thereafter rectify the transformer output in order to provide a d.c. control voltage for operating the thyristor gating control system.

Still another approach is to utilize a variable light source together with a photosensitive device to produce a d.c. output representative of a lever position. An example of such a device is shown in U.S. Pat. No. 3,383,518—Copland et al. Devices of this type have the distinct advantage of not requiring frictional contact for its operation, and moreover the characteristics of the light metering shutter can be easily tailored to individual applications. Unfortunately, such devices have offsetting disadvantages which make them unsuitable for replacement of potentiometer controls in electric vehicles. Photo transistors, often used as the photosensitive element, are not consistent in their characteristics and necessitate fine adjustments to or modification of each individual device. Moreover optical devices are sensitive to films of dirt and condensation, and mechanical shutter devices used with them are susceptible to movement due to shocks and vibration of the vehicle. Although dirt buildups may be avoided by the use of hermetically sealed devices and the apparatus may be strengthened to better resist shocks, the expense entailed in producing such a sensor has been found to be prohibitive. It will therefore be understood that it would be highly desirable to produce a non-contacting, manually operated control for varying the mark-space ratio of a thyristor of a pulse control system.

It is therefore an object of the present invention to provide improved means for controlling the mark-space ratio of a pulse control thyristor in an electric vehicle drive system.

It is another object of the present invention to provide a control system for an electric vehicle utilizing non-contacting means for translating the position of a movable element into a control signal for operating a thyristor in a pulse control system.

SUMMARY OF THE INVENTION

Briefly stated, in accordance with one aspect of the invention the foregoing objects are achieved by coupling a rotatable Hall generator to a manually movable lever, and limiting the rotation of the Hall element to a predetermined value. A substantially uniform magnetic field is generated for intercepting the Hall element approximately orthogonally to its axis of rotation. Leads are provided to supply electric current to the Hall effect element, and an output signal is derived from the Hall generator which is a function of rotation of the device. Circuit means transmit the Hall generator output signal to a thyristor control system for varying the mark-space ratio of the thyristor as a function of lever rotation.

In the preferred embodiment of the invention, rotation of the Hall generator is limited to substantially 30° in either direction in order to produce a substantially linear output signal. The circuit means advantageously comprise shaping means for producing an output voltage whose rate of change increases with shaft rotation.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE PREFERRED EMBODIMENT

Figure 1:
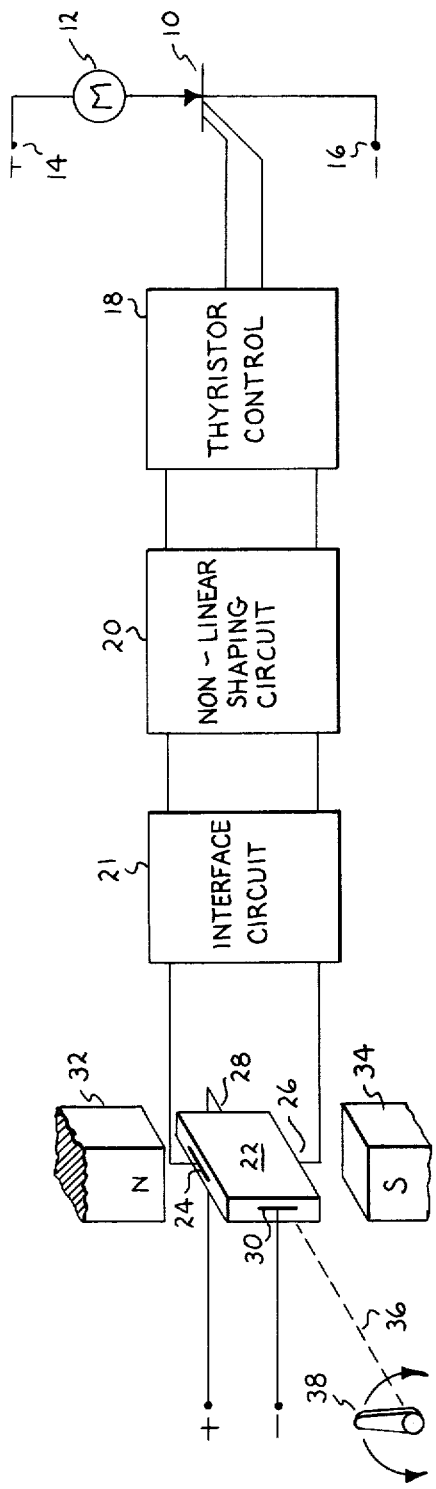
FIG. 1 is an idealized schematic diagram of the present invention.

Referring now to FIG. 1 there is shown in idealized form a system for controlling the operation of the motor of a traction vehicle as a function of the position of a manually operated element. A thyristor 10 serves to couple a d.c. traction motor 12 across a pair of terminals 14, 16 which are adapted to be coupled to a source of d.c. potential such as a battery (not shown). A thyristor control circuit 18 is coupled to thyristor 10 for controlling the conduction thereof. For simplicity in representation, thyristor 10 may be considered to have two control terminals for gating the thyristor on and off although it will be recognized that in practice a separate commutation circuit may be utilized to extinguish the thyristor. An interface circuit 21, hereinafter described in detail, converts the bipolar output voltage of a Hall effect element 22 to a single-polarity signal and applies it to a nonlinear shaping circuit 20. The shaped, control voltage thus achieved is applied to the input terminals of control 18 for varying the operation thereof in response to a received signal. The input terminals of the interface circuit 21 are in turn coupled across opposite faces 24, 26 of Hall effect element 22. Across a pair of opposed faces, oriented orthogonally to the first-mentioned faces of the element, are a second pair of electrodes 28, 30 which are adapted to be coupled to a source of d.c. current (not shown). A pair of magnetic poles 32, 34, which may be opposing poles of a permanent magnet, produce a magnetic field within the Hall generator 26. In a preferred embodiment poles 32, 34 are configured to produce a substantially uniform magnetic field which extends past the edges of Hall element 22. In this case the Hall generator is practically prevented from producing spurious signals in the presence of vibration or shock which procure the displacement of the Hall element in a direction parallel to axis of rotation 36, and/or in a plane perpendicular thereto. As long as element 22 is within the uniform field the signal outputted thereby can only be changed by a rotation of the element relative to poles 32, 34 and it is elementary that externally generated shocks cannot produce a couple about axis 36 to cause such rotation. In order to facilitate operation of the generator, the Hall generator is mounted upon suitable bearings which allow rotation of the poles relative to the Hall element about an axis 36, and is linked to a lever 38.

To operate the control the vehicle operator moves lever 38 from an initial "off" or null position to a position corresponding to the desired vehicle speed. Since current of a constant amplitude is supplied between terminals 28 and 30 the potential appearing across electrodes 24 and 26 of the Hall element 22 is related to the angle at which the element intercepts the magnetic field extending between poles 32 and 34, and to the strength of the field. Assuming a substantially constant flux distribution, the output voltage will vary with the sine of angle of rotation. By confining the angle of rotation of the Hall generator 22 to an included angle of substantially 30° in either direction, the output of the generator may be considered to be substantially linear. While it is not necessary to effect system operation as a linear function of rotation, it will be recognized by those skilled in the art that a linear relationship is more easily modified by shaping circuitry to achieve a desired relationship.

In the present invention, the potential arising across terminals 24 and 26 of the Hall effect element is applied to a non-linear shaping circuit 20. While the characteristics of shaping circuit 20 may be varied to suit a given application, it has been found that for electric vehicles of the industrial type it is desirable to effect speed control as an approximately parabolic function of lever operation. The shaping circuit may thus advantageously provide a "square law" type of characteristic to an applied signal such that the power developed by the motor varies only slightly with initial increments of lever movement, but by a greater amount as lever is positioned further toward the maximum power setting.

The signal voltage obtained from circuit 20 is supplied to a thyristor control 18 which may comprise an oscillator. The operation of the oscillator is then varied as a function of the applied signal. In this manner the mark-space ratio of the conduction of thyristor 10, and therefore the effective voltage appearing across the terminals of motor 12, is caused to vary as an appropriate nonlinear function of lever rotation.

Figure 2:
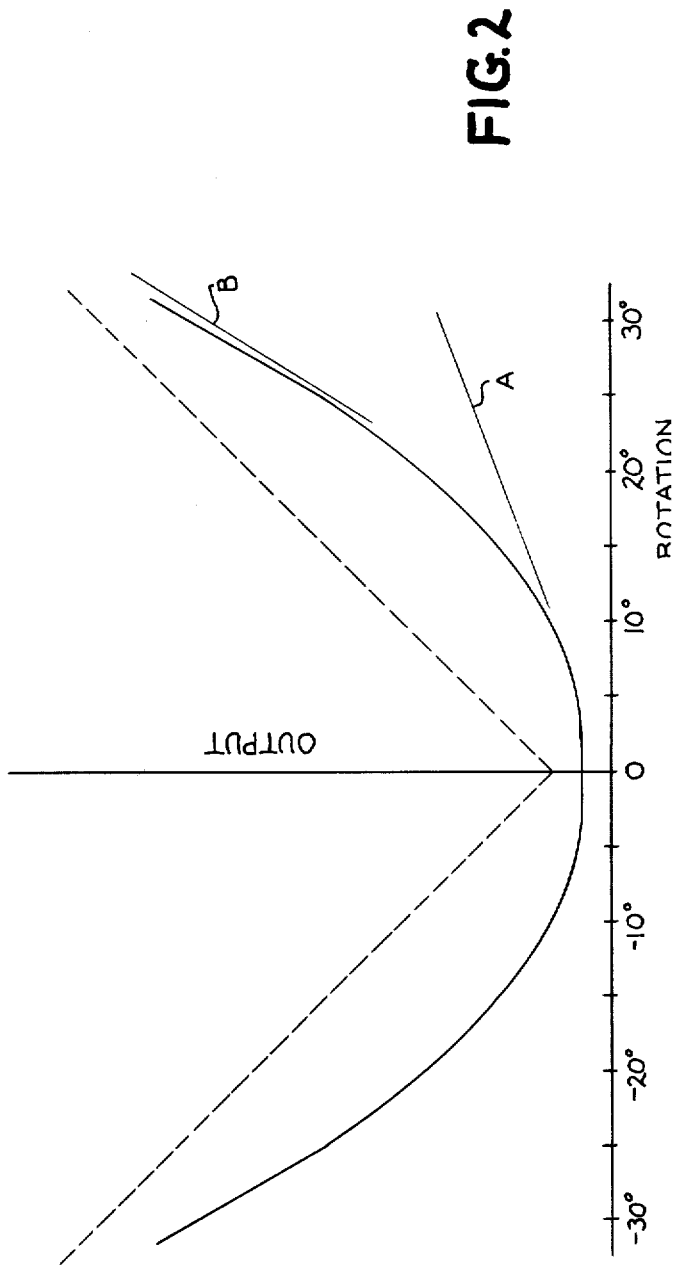
FIG. 2 is a graphical representation of system output voltage as a function of operation of a manually rotatable element.

Referring now to FIG. 2, there is set forth by way of illustration a preferred relationship between the operation of thyristor 10, and therefore impliedly the output signal of shaping circuit 20, and the angular rotation of a manually operated lever 38. In the mode of operation described hereinabove, it is assumed that angular rotation of the lever is limited to substantially 30° on either side of a central position (total rotation of 60°) in order to provide a linear voltage output. In this case, the first quadrant of the depicted graph sets forth the operation of the circuit over the full range of lever position. Initial, small increments of motion of the lever effect relatively small changes in output, while further rotational increments produce progressively larger changes in the output signal.

For vehicles in which it is desired to provide a single control for both forward and reverse travel, the desired maximum net rotation of 60° may be apportioned to rotations of 30° in either direction from a null or zero point. In this case, the curve depicted in the second quadrant of the illustrated system is also generated, and considered to be a substantially mirror image of that in the first quadrant.

Figure 3:
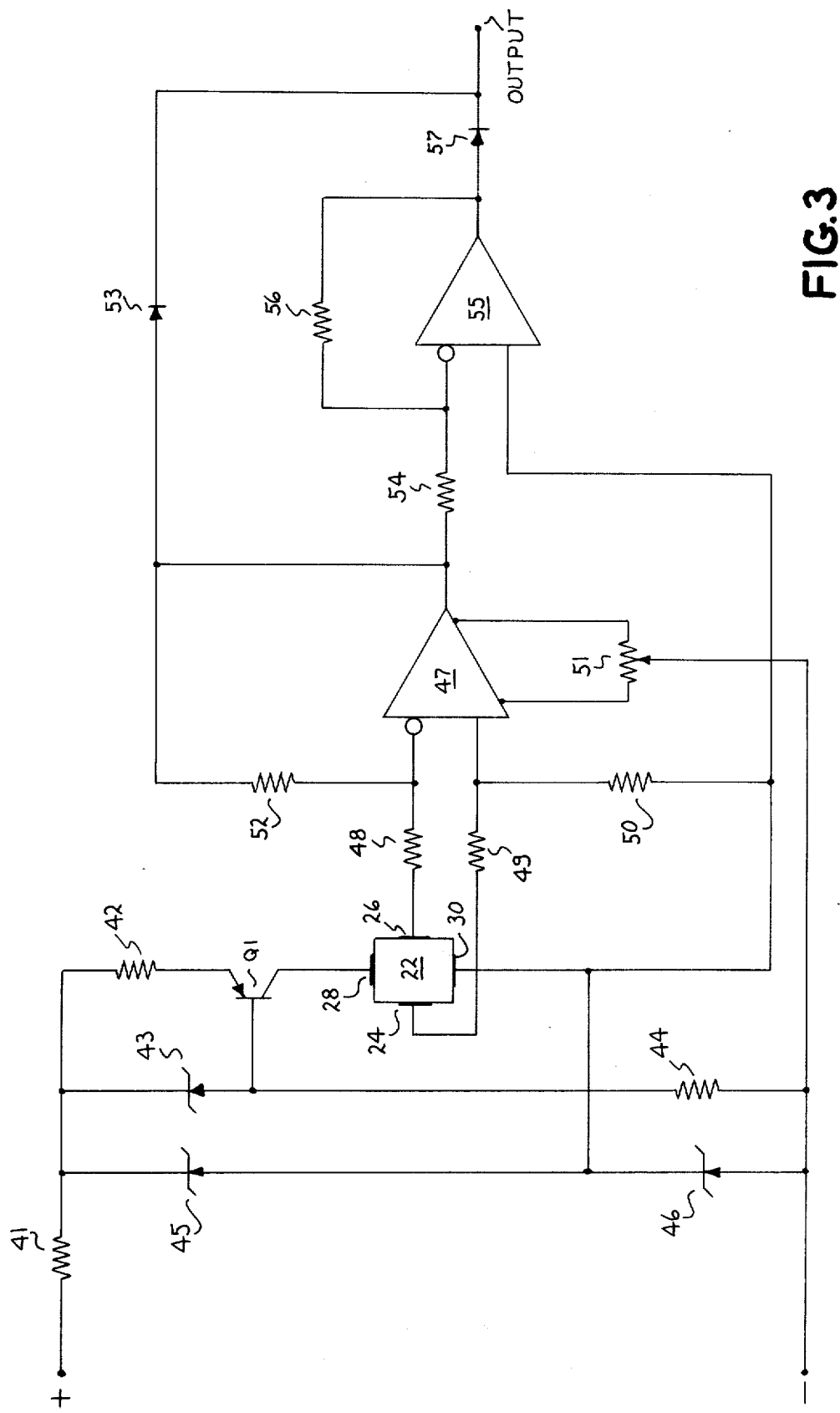
FIG. 3 is a schematic diagram showing details of one portion of the inventive system.

FIG. 3 shows one circuit adapted to operate in conjunction with a Hall effect element for producing a linearly-increasing positive voltage for both positive and negative rotations of the Hall element. A positive bias is applied through resistors 41 and 42 to the emitter terminal of a transistor Q1. Zener diode 43 maintains a constant potential across resistor 42 for Q1 so that Q1 acts as a constant current source for Hall effect element 22. A resistor 44 couples the base of Q1 to a source of common potential and a voltage divider comprising the series combination of two Zener diodes 45 and 46 provides a predetermined voltage to the lower end of Hall element 22, which also serves as a source of reference potential for further circuitry. The output terminals 24, 26 of Hall element 22 are coupled to a comparator 47 through resistors 48 and 49. While comparator 47 may comprise any suitably connected operational amplifier, in one successfully tested embodiment a commercially available integrated circuit JEDEC No. 741 was utilized. Resistor 50 and potentiometer 51 supply the necessary voltages to properly bias comparator 47, while resistor 52 forms a feedback path thereabout. The output terminal of amplifier 47 is connected by way of isolation diode 53 to an output terminal and by way of resistor 54 to one input terminal of a second comparator 55, advantageously constructed of an integrated circuit amplifier identical to that used for comparator 47. A feedback resistor 56 is coupled about the amplifier, and a second isolation diode 57 couples the output of amplifier 55 to the output terminal.

When placed in an uniform magnetic field, the constant current flowing through transistor Q1 assures that the voltage signal arising across Hall effect element 22 will be a function of the orientation of the element with respect to a magnetic field. As element 22 is rotated in a first, "positive" direction a positive voltage appears upon the noninverting input terminal of comparator 47, causing the output voltage thereof to rise in a corresponding manner. The positive-going signal outputted by comparator 47 is transmitted by way of diode 53 to the output terminal of the circuit. At the same time the positive-going signal is applied to the input terminal of comparator 55 which, with the connection scheme shown, acts as an inverter. Comparator 55 outputs a negative-going signal which is the complement of that produced by comparator 47. The negative-going signal, however, reverse biases isolating diode 57 and therefore has no effect upon the positive signal appearing at the output terminal of the circuit.

When the Hall generator is rotated in the opposite or "negative" direction the polarity of the signal applied to comparator 47 reverses, a positive-going signal now appearing at the inverting input terminal thereof. Comparator 47 now outputs a linearly increasing negative signal which back-biases isolation diode 53 and is thus precluded from appearing at the output terminal of the circuit. The negative-going signal also traverses resistor 54 to appear at the input terminal of amplifier 55. Amplifier 55 operates in the manner described above to apply a positive-going signal, which is the complement of that received from comparator 47, through diode 57 to the output terminal of the circuit. In the foregoing manner, a linearly increasing positive voltage appears at the output terminal of the circuit of FIG. 3 in response to rotation of the Hall generator in either a forward or a backward direction.

Figure 4:
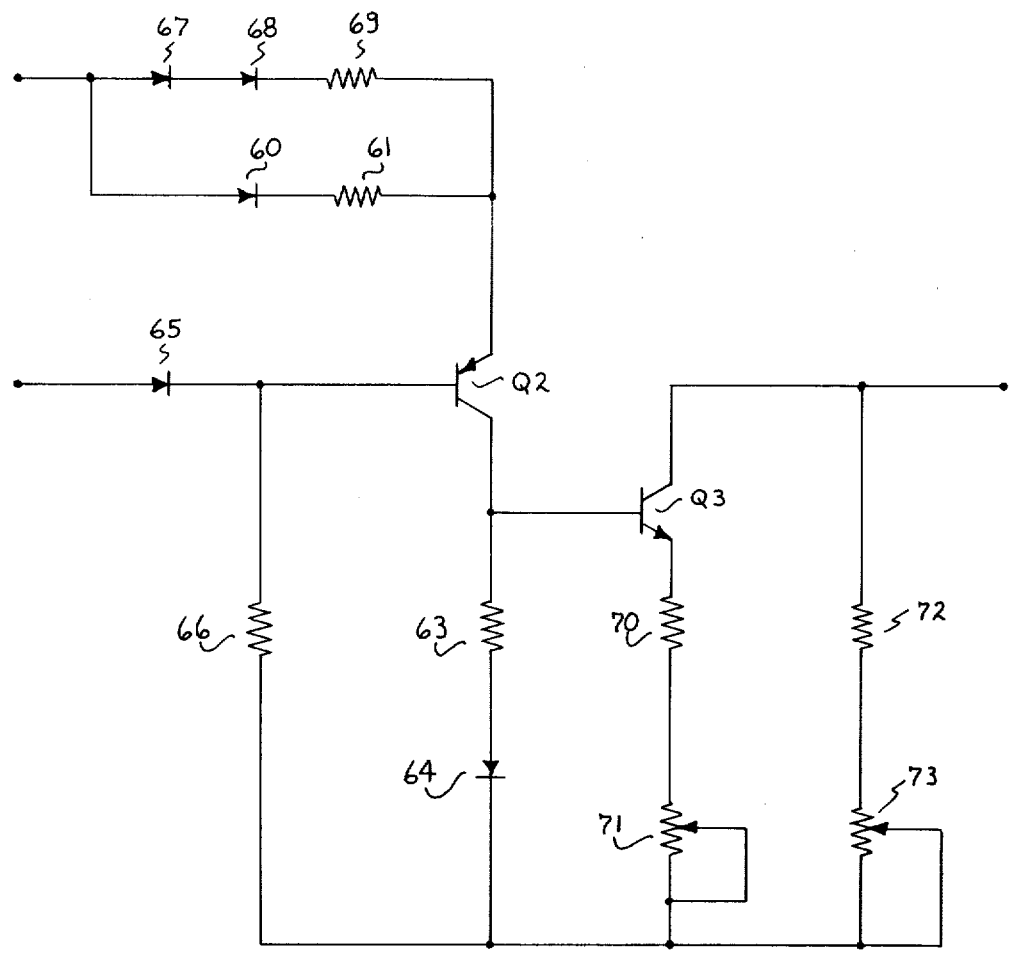
FIG. 4 is a schematic diagram of another portion of the system.

Referring now to FIG. 4, there is shown a shaping circuit which acts in response to a linearly increasing positive signal to produce an output signal whose slope, or rate of change, varies with the value of the input signal. A first, threshold diode 60 and associated resistor 61 couple the input terminal of the circuit to the emitter terminal of a transistor Q2 whose collector terminal is in turn coupled to a source of common or reference potential by the series combination of a resistor 63 and compensation diode 64. A suitable bias for Q2 is provided through compensating diode 65 and biasing resistor 66. A second path for applied input signals is provided by a series-connected pair of threshold diodes 67, 68 and resistor 69.

The above-described circuit operates in the manner of an emitter follower to apply an output signal to the base terminal of a transistor Q3, whose collector terminal forms the output terminal of the circuit. The emitter terminal is coupled to a point of ground or common potential by a means of serially coupled resistor 70 and potentiometer 71. Also shunting the output terminal to ground is the series combination of a resistor 72 and potentiometer 73.

The linearly-increasing signal from the circuit of FIG. 3 is applied to the input terminal of the circuit shown in FIG. 4. When this signal has attained a sufficient value it forward-biases threshold diode 60 and flows through resistor 61 to effect current flow through transistor Q2, which is manifested by a rise in the voltage appearing at the base of transistor Q3. As transistor Q3 becomes more conductive, it presents a path of increasingly lessened impedance across the normally present impedance comprised by resistor 72 and potentiometer 73. The signal at the output terminal, which may be viewed as an impedance, or equivalently a voltage to be supported by said impedance, changes correspondingly. As the voltage signal applied to the input terminal of the present circuit increases still further, the voltage drop arising across diode 60 and resistor 61 exceeds the combined threshold potentials of diodes 67 and 68. The last-mentioned diodes now begin to pass current to resistor 69, which is advantageously of a smaller value than resistor 61. This activity increases still more rapidly the current flow through transistor Q2, and thus the biasing potential applied to the base of transistor Q3. The change in the output signal of the circuit thus becomes more pronounced with a change in input voltage, and increases at a rate much faster than previously.

It will be appreciated by those skilled in the art that transistor Q2 and the circuitry associated therewith serve to translate the reference level of the signals received for more easily operating transistor Q3. Under some conditions, a linearly increasing control signal derived from the circuit of FIG. 3 might be applied directly to the base terminal of transistor Q3 by means of a parallel circuit comprising a first leg including diode 60 and resistor 61, and a second, parallel leg comprising diodes 67, 68 and resistor 69. In any event, it will now be appreciated that the net effect of the present circuit is to provide an output signal having a very small initial incremental change, until first threshold diode 60 begins to conduct, a still larger rate of change thereafter, and a still greater rate of change upon the entering into conduction of other threshold diodes 67 and 68.

The above-described characteristic of the circuit of FIG. 4 is clearly set forth in FIG. 2. The dashed lines extending into the first and fourth quadrants of the depicted coordinate system represent the signal outputted by the circuit of FIG. 3 in response to the rotation of the Hall generator. The solid line demonstrates the effect of the shaping circuit of FIG. 4. About the origin of the coordinate system, it will be seen that a first, very slight response is noted for initial increments of motion of the Hall generator. This activity reflects the requirement for first, initial voltage to cause a first threshold diode to enter into conduction. A subsequent portion of the curve in both quadrants, approximated by a slope "A" indicates the change in output signal during the time when only one threshold diode is conducting. Finally, the steeper slope of the curve, indicated at "B," demonstrate the increased response manifested after the entering into conduction of the additional threshold diodes. The composite slope thus achieved somewhat approximates a parabola. Specific mathematic formulation of this curve is, however, immaterial to the present invention, the salient consideration being a significant increase in the rate of change between the signal outputted by the system, and that being inputted thereto.

Figure 5:
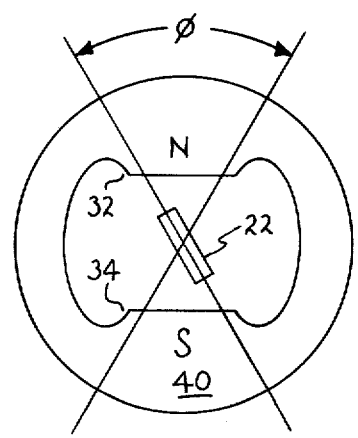
FIG. 5 is a cross-sectional representation showing the construction of a Hall generator of a type useful in practicing the invention.

FIG. 5 shows in simplified form a Hall generator structure suitable for use in the present speed control system. One device of this type is disclosed in U.S. Pat. No. 3,184,620—Leibowitz et al. A magnetic housing 40, which may be comprised of any suitable material, has formed therein opposing magnetic poles 32, 34. The depicted configuration of the magnetic element gives rise to a substantially constant magnetic field in the area between the poles. The Hall element 22 is disposed in this area, and adapted for rotation relative to magnet 40. Due to the necessity of attaching conductors and supplying power to the Hall element, in a preferred embodiment the Hall element 22 is stationary while magnet 40 is coupled to rotatable lever 38 such that the housing rotates about the axis of the Hall element.

With this approach, it is still considered desirable to restrict the total angle of rotation $\phi$ to substantially 60° in view of the substantially sinusoidal voltage characteristic of the Hall generator. Should larger angles be utilized, it would be necessary to provide a shaping circuit of substantially increased complexity. Such an approach would detract from simplicity and the ease of adaptation provided by the present invention.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. Speed controlling means for a vehicle powered by an electric traction motor coupled to a source of d.c. potential comprising:
   magnetic means for producing a magnetic field in a predetermined location;
   Hall effect means disposed in the field produced by said magnetic means;
   a first pair of electrodes coupled to the Hall effect means for providing a current path to a source of d.c. potential;
   a second pair of electrodes coupled to said Hall effect means for receiving an output voltage which varies as a function of position of said Hall effect means;
   manually operable means for rotating said Hall effect means with respect to said magnetic means;
   a thyristor for coupling the d.c. traction motor to the d.c. source;
   thyristor control means for varying the mark-space ratio of the thyristor as a function of an applied control voltage; and
   a shaping circuit for producing an output voltage whose rate of change increases with an increasing input voltage for coupling said second pair of electrodes to said thyristor control means.

2. The invention defined in claim 1, wherein said output voltage varies substantially as the square of said input voltage.

3. In an electric vehicle, speed control means for varying the mark-space ratio of a thyristor coupling a traction motor to a source of d.c. potential, comprising:
   a Hall effect generator;
   manually operable means for rotating said Hall effect generator to produce an output voltage proportional to the angle of rotation, wherein the total rotation of said manually operable means is limited to cause said Hall effect generator to produce a signal which varies substantially linearly with rotation of said manually operable means;
   thyristor control means coupled to the thyristor and adapted to control the rate of conduction of said thyristor in response to a signal voltage; and
   circuit means for coupling the output voltage of said Hall effect generator to said thyristor control means whereby the mark-space ratio of said thyristor varies as a predetermined function of the operation of said manually operable means.

4. The invention defined in claim 3, wherein said circuit means comprises shaping circuitry for producing a substantially square law response to a linearly changing signal.

5. The invention defined in claim 4, wherein said thyristor control means comprises means for gating and for commutating said thyristor.

* * * * *